US012512596B1

(12) United States Patent
Wrigley et al.

(10) Patent No.: US 12,512,596 B1
(45) Date of Patent: Dec. 30, 2025

(54) LONGITUDINALLY RIDGED QUAD POLARIZER FEED

(71) Applicant: Lockheed Martin Corporation, Bethesda, MD (US)

(72) Inventors: Jason Stewart Wrigley, Littleton, CO (US); Nathan Jastram, Highlands Ranch, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1092 days.

(21) Appl. No.: 17/518,782

(22) Filed: Nov. 4, 2021

(51) Int. Cl.
*H01Q 13/02* (2006.01)
*H01P 1/165* (2006.01)
*H01P 1/17* (2006.01)
*H01P 3/123* (2006.01)
*H01Q 15/24* (2006.01)

(52) U.S. Cl.
CPC ......... *H01Q 13/0275* (2013.01); *H01P 1/165* (2013.01); *H01P 1/171* (2013.01); *H01P 3/123* (2013.01); *H01Q 15/244* (2013.01); *H01Q 15/242* (2013.01)

(58) Field of Classification Search
CPC ........ H01P 1/165; H01P 1/171; H01P 1/1231; H01P 3/123; H01Q 13/0275; H01Q 15/24–246
See application file for complete search history.

(56) References Cited

U.S. PATENT DOCUMENTS

| | | | | |
|---|---|---|---|---|
| 4,096,482 A * | 6/1978 | Walters | H01Q 5/45 343/778 |
| 4,119,967 A * | 10/1978 | Johnson | H01Q 13/0258 343/756 |
| 6,097,264 A * | 8/2000 | Vezmar | H01P 1/173 333/157 |
| 6,271,799 B1 * | 8/2001 | Rief | H01Q 13/0258 343/786 |
| 11,881,607 B1 * | 1/2024 | Wrigley | H01P 1/161 |
| 12,355,149 B1 * | 7/2025 | Willis | H01P 1/171 |
| 2002/0113746 A1 * | 8/2002 | Strickland | H01Q 13/0266 343/786 |

(Continued)

FOREIGN PATENT DOCUMENTS

EP 3761442 A1 * 1/2021 .............. H01P 3/123

OTHER PUBLICATIONS

Jazani, Ghoncheh et al., "Design of Dual-Polarized (RHCP/LHCP) Quad-Ridged Horn Antenna With Wideband Septum Polarizer Wave Guide Feed," IET Microwaves, Antennas & Propagation, vol. 12, Iss. 9, pp. 1541-1545, 2018.

*Primary Examiner* — AB Salam Alkassim, Jr.

(57) ABSTRACT

Longitudinally ridged quad polarizer feeds include a waveguide spanning a longitudinal axis between a feed port and an antenna port, with first ridge elements that span longitudinally from the feed port on first opposing walls of the waveguide and second ridge elements that span longitudinally from the feed port on second opposing walls of the waveguide. A polarization of a radio frequency signal transiting the waveguide is altered based at least on a difference in longitudinal lengths between the first ridge elements and the second ridge elements. These polarizers can be formed from a single workpiece using an injection molding technique, leading to a reduction in manufacturing complexity, cost, and mass.

19 Claims, 6 Drawing Sheets

(56) References Cited

U.S. PATENT DOCUMENTS

| | | | | |
|---|---|---|---|---|
| 2003/0142027 | A1* | 7/2003 | Moheb | H01P 1/2131 343/840 |
| 2007/0262835 | A1* | 11/2007 | Vanin | H01P 5/024 333/212 |
| 2011/0050527 | A1* | 3/2011 | Anderson | H01Q 13/0275 343/786 |
| 2011/0057849 | A1* | 3/2011 | Naym | H01Q 19/132 343/756 |
| 2013/0342390 | A1* | 12/2013 | Cha | H01Q 19/195 342/352 |
| 2014/0009351 | A1* | 1/2014 | Jardin | H01Q 13/02 343/756 |
| 2015/0162668 | A1* | 6/2015 | Oppenlaender | H01Q 21/0025 343/776 |
| 2015/0188238 | A1* | 7/2015 | Oppenlaender | H01Q 21/064 343/756 |
| 2018/0191048 | A1* | 7/2018 | Hou | H01P 1/171 |
| 2018/0358709 | A1* | 12/2018 | You | H01Q 21/064 |
| 2020/0381794 | A1* | 12/2020 | Yukawa | H01P 3/123 |
| 2021/0203076 | A1* | 7/2021 | Boin | H01Q 1/288 |
| 2022/0190477 | A1* | 6/2022 | Girard | H01P 5/107 |
| 2022/0247085 | A1* | 8/2022 | Leib | H01Q 13/06 |
| 2023/0268657 | A1* | 8/2023 | Merk | H01Q 15/242 343/756 |
| 2023/0411857 | A1* | 12/2023 | Hu | H01Q 13/0225 |
| 2024/0243481 | A1* | 7/2024 | Hu | H01Q 13/0266 |
| 2024/0250434 | A1* | 7/2024 | Wang | H01Q 21/065 |
| 2025/0253547 | A1* | 8/2025 | Hajitabarmarznaki | H01Q 21/24 |

* cited by examiner

500

510

LONGITUDINALLY RIDGED QUAD POLARIZER FEED

TECHNICAL BACKGROUND

Various radio frequency (RF) waveguide-based structures are employed in wireless transmission systems that communicate over microwave bands. For example, polarizers can be employed in microwave feed networks which convert polarizations of signals between linear and circular polarizations, and vice-versa. Polarizers are often employed in satellite communication system feed structures for communication uplinks and downlinks that can be arranged into steerable arrays of horn antennas. However, waveguides and associated polarizers can be difficult to design and manufacture due in part to the high sensitivity of feed structures and waveguides to manufacturing precision, symmetry, and geometric configurations which can lead to distortions like passive intermodulation. Moreover, the polarizer structure itself can have bandwidth limitations related to particular geometries and manufacturing techniques. This has led to creation of many styles of polarizers and microwave horn antenna feed networks of varying complexity.

One such polarizer is the pinch polarizer which generates circularly polarized outputs from linearly polarized source signals. A pinch polarizer includes a waveguide structure having a dimple or ‘pinch’ along its length which alters the signal polarization using the geometry of the associated waveguide. Manufacturing of pinch polarizers can be achieved using conventional machining techniques, such as forming the waveguide on a lathe followed by a mechanical compression to form the pinch feature. While the pinch polarizer comprises a single workpiece, the achievable bandwidth and axial ratio are limited, and the feasible types of manufacturing techniques are restricted due to the ‘undercuts’ presented in the waveguide by the pinch feature. Moreover, the pinch polarizer has a circular cross-sectional shape and couples to a corresponding horn element which is also circular in cross-section, leading to lower spatial and RF efficiency when deployed into large arrays of horns.

Other polarizers involve lateral corrugations or teeth formed in a waveguide to generate the desired polarization properties. A corrugated polarizer feed achieves better axial ratio performance and a higher bandwidth than a pinch polarizer, however, the feasible types of manufacturing techniques are also restricted due to the undercuts presented by the corrugations. Also, corrugated polarizer feeds are typically high complexity and high mass, even if a greater efficiency is achieved in arrays due to the corresponding square horn shape.

OVERVIEW

Discussed herein are enhanced polarizers for microwave RF feed networks, referred to as quad polarizer feeds. These polarizers can be manufactured using injection molding techniques that incorporate draft angles into the associated geometry and preclude undercuts or overhangs. Thus, the polarizers discussed herein can be formed from a single workpiece using an injection molding technique, and later plated with a conductive material on RF surfaces. This leads to a large reduction in manufacturing complexity, cost, and mass—while simultaneously increasing performance characteristics with relation to other types of polarizers. Additionally, the examples herein utilize a square aperture and waveguide structure, which provides a higher spatial and RF efficiency in an array environment.

In a first example implementation, a longitudinally ridged polarizer feed includes a waveguide spanning a longitudinal axis between a feed port and an antenna port, with first ridge elements that span longitudinally from the feed port on first opposing walls of the waveguide and second ridge elements that span longitudinally from the feed port on second opposing walls of the waveguide. A polarization of a radio frequency signal transiting the waveguide is altered based at least on a difference in longitudinal lengths between the first ridge elements and the second ridge elements.

In another example implementation, a horn antenna assembly comprises a polarizer and a horn antenna element. The polarizer comprises a waveguide spanning a longitudinal axis between a feed port and an antenna port, wherein the feed port is arranged having a diagonal alignment with respect to walls of the waveguide. The polarizer also includes first ridge elements that span a first length along the longitudinal axis from the feed port on first opposing walls of the waveguide, and second ridge elements that span a second length along the longitudinal axis from the feed port on second opposing walls of the waveguide. The first length is different than the second length in this example implementation. The horn antenna element comprises a horn structure having a radio frequency aperture and a port, where the port is coupled to the antenna port of the polarizer.

In yet another example implementation, a method of manufacturing includes forming a waveguide having a generally square cross-section spanning a longitudinal axis between a feed port and an antenna port, where the feed port is arranged having a diagonal alignment with respect to walls of the waveguide. The method also includes forming first ridge elements having a first length spanning from the feed port and along the longitudinal axis on first opposing walls of the waveguide, and forming second ridge elements having a second length spanning from the feed port and along the longitudinal axis on second opposing walls of the waveguide.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
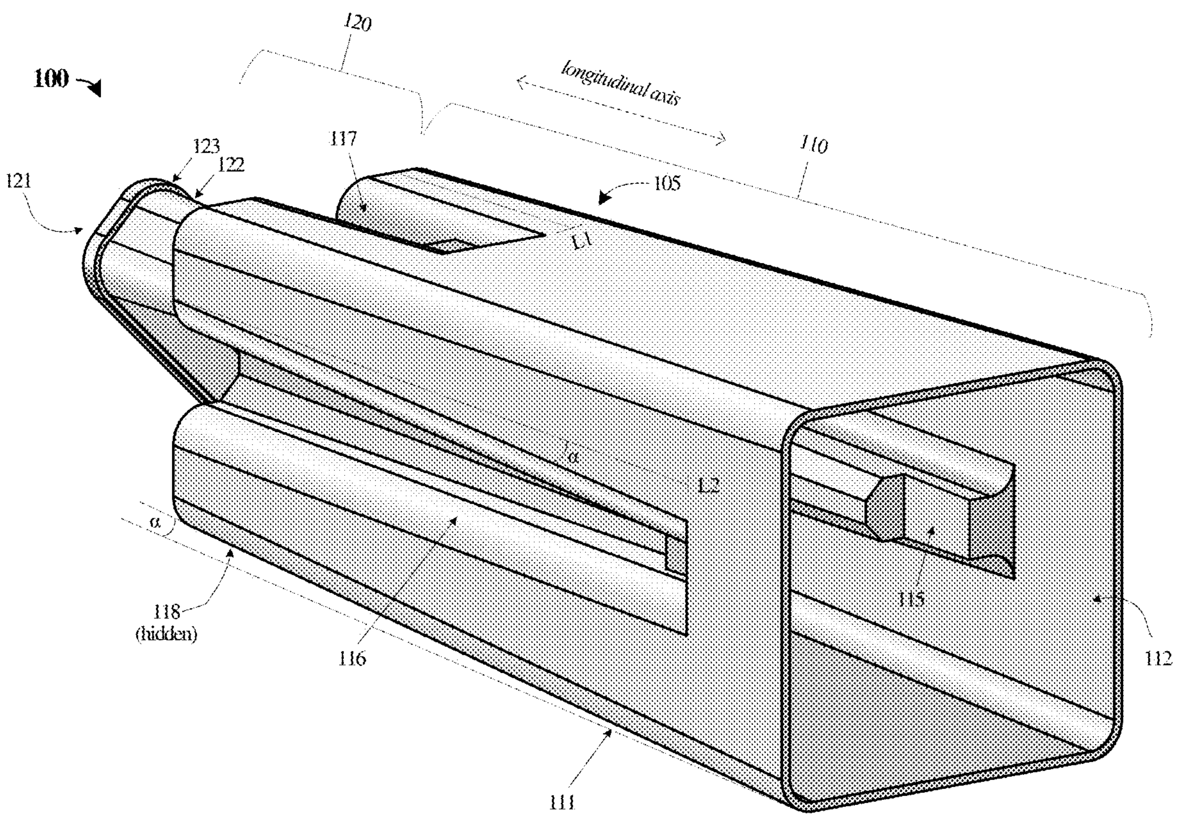
FIG. 1 illustrates a quad polarizer feed in an implementation.
Figure 1:
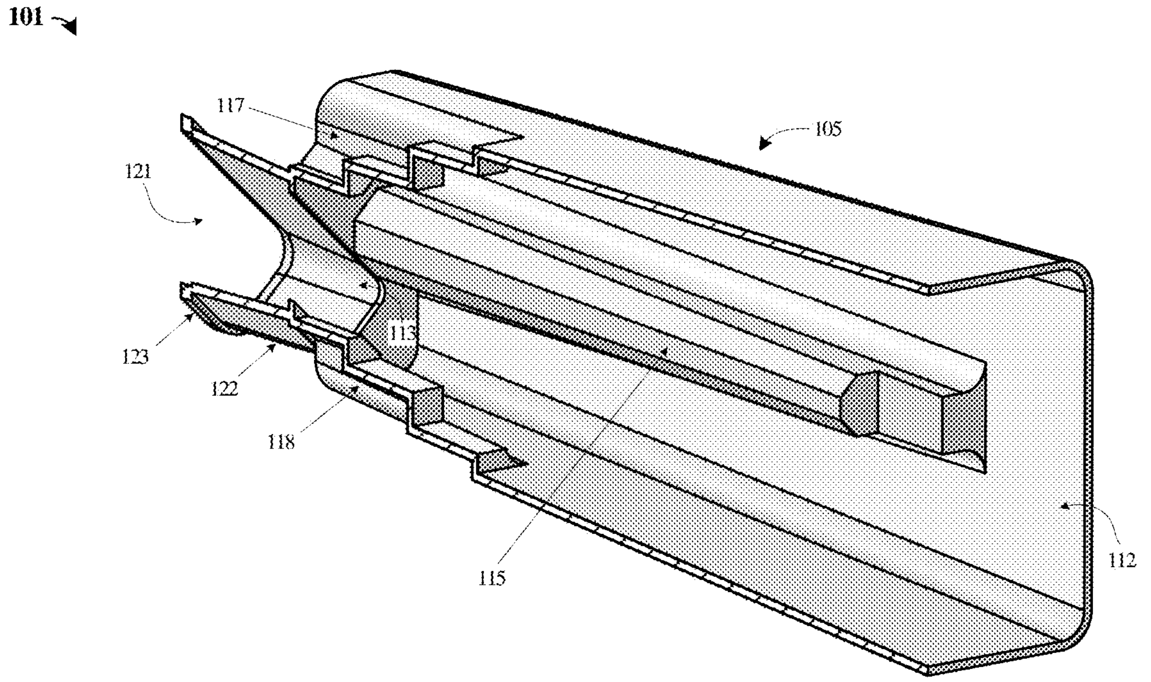

Polarizers can be deployed in microwave RF feed networks to convert polarizations of signals between linear and circular polarizations, and vice-versa. Linear vertical (or linear horizontal) polarization typically refers to a single electromagnetic signal propagating in a single plane along the direction of propagation, while circular polarization includes two linear components that are perpendicular to each other and having a phase difference of 90° (π/2). Other polarizations are possible, such as elliptical. Often, feed networks with polarizers are coupled to horn antennas used for transmitting or receiving microwave communications. Large arrays of horn antennas, perhaps using hundreds of elements, can form electronically steerable arrays (ESAs) for satellite communications, terrestrial backbone communications, aircraft communications, radar systems, and other various applications. Conversion of polarizations of signals in such communication systems can enable more effective communications between endpoints having varied or unpredictable orientations. For example, it can be helpful to use circular polarization to communicate from a satellite to ground stations, aircraft, or vehicles.

The examples discussed herein comprise polarizer feed structures and manufacturing techniques that generate circular polarization from single polarization in communication applications with a compact equipment envelope and with low mass. Moreover, injection molding techniques can be employed to achieve cost savings in large quantities, such as forming large arrays or horn antennas in ESAs. When injection molding or casting techniques are employed to manufacture polarizers or associated horn structures, draft angles are included to slope cross-sectional areas along certain axes. These draft angles are typically a requirement of the manufacturing tooling or process to prevent material overhangs or parallel surfaces in order to release the workpiece from a mold or die. A broadband quad-ridged polarizer feed is discussed herein that includes draft angles to facilitate injection molding without undercuts. Injection molding results in a significant mass decrease, fewer mechanical operations, and order of magnitude materials cost decrease when manufacturing large quantities of polarizer feeds or horn antennas with such polarizer feeds when compared to manufacturing using electrical discharge machining (EDM) or direct machining. While several examples cover portions of the RF microwave Ku band (approximately 12 to 18 GHz) or X band (approximately 8 to 12 GHz), it should be understood that other RF bands can be supported with accompanying scaling in size or geometry suitable to the corresponding wavelengths. Additionally the polarizer feeds and associated horn antennas can utilize a square aperture which provides higher spatial efficiency and performance in an array environment, but circular, triangular, hexagonal, or irregular horn antennas can be employed using similar techniques.

Materials employed for the elements of the polarizers or horn antennas or any of the quad-ridged polarizer feeds discussed herein can include any injection-moldable material. Examples include plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Once formed, conductive surface treatments are typically applied at least to surfaces in contact with RF signals. These conductive surface treatments include various platings, including conductive materials, metallic substances, metals, metal alloys, and the like, such as aluminum, copper, silver, gold, or other similar metals or associated combinations.

Turning now to a first example polarizer feed, FIG. 1 is presented. FIG. 1 illustrates isometric view 100 and cross-sectional view 101 of quad polarizer feed 105 in an implementation. Cross-sectional view 101 is sectioned at centerlines of the top/bottom waveguide walls along a longitudinal axis of quad polarizer feed 105.

Quad polarizer feed 105 comprises two portions 110 and 120. Portion 110 includes waveguide 111 comprising a cavity surrounded by walls forming a generally square waveguide shape along a longitudinal axis. Portion 110 also includes external port 112, internal port 113, and waveguide wall ridges 115-118. Portion 120 includes interfacing elements that couple internal port 113 to port 121, which can then couple to other RF elements, such as further waveguides that might feed quad polarizer feed 105. Port 121 can also be referred to as a feed point or feed ports, depending on the configuration. Ports 112-113 and 121 comprise apertures that can have a throat/opening width which depends on the particular wavelength of RF communications. Draft angle 'α' is shown for walls of waveguide 111, and this angle can be reflected in other features of quad polarizer feed 105, such as internal ridge features and waveguide interface features. While a can be approximately 1°, the particular angle used can be selected based on the manufacturing process and typically is minimized for a particular process. Also, the example draft angle α does not need to be equal throughout the workpiece, but is typically selected to maintain mirror symmetry along the longitudinal axis.

Waveguide wall ridges 115-118 are included in waveguide 111. Waveguide wall ridges 115-118 are located on top/bottom walls and left/right (side) walls of waveguide 111 and centered on the corresponding waveguide walls. While waveguide wall ridges 115-118 are not necessary to be centered on the associated walls of waveguide 111, the effectiveness of the ridges can be affected by placement away from center. Waveguide wall ridges 115-118 extend from internal port 113 of waveguide 111 along a longitudinal axis of waveguide 111 for selected lengths. Side ridges 115-116 can have a corresponding length L1, and top/bottom ridges 117-118 can have a corresponding length L2. Typically, L1 and L2 are selected to be a different length, which can be selected to achieve to a target phase shift and target power split among propagation modes transiting waveguide 111, such as a 90° phase shift and equal power split between horizontal/vertical propagation modes. A generally trapezoidal shape with tapers, fillets, or chamfers along longitudinal edges is employed for waveguide wall ridges 115-118 in FIG. 1, although variations are possible, such as triangular, half-circular, half-elliptical, or other shapes that support use of draft angles. Also, although not required, waveguide 111 is shown with filleted corners. Waveguide wall ridges 115-118 also incorporate draft angles α along each face. Thus, a thickness of waveguide wall ridges 115-118 changes over the longitudinal axis, with an initial thickness (or 'depth' into the cross-sectional area of internal port 113 of waveguide 111) tuned based on a desired bandwidth as well as other performance characteristics. A step-down termination of waveguide wall ridges 115-118 to the side walls of waveguide 111 is formed at corresponding lengths L1/L2 for each of waveguide wall ridges 115-118, although a full taper to the side walls might be included if supported by the manufacturing process.

Portion 120 of quad polarizer feed 105 comprises interfacing elements that couple internal port 113 of waveguide 111 to other RF elements, such as further waveguides which might feed waveguide 111 or receive signals from waveguide 111. Specifically, portion 120 includes port interface section 122 and waveguide interface flange 123. Portion 120 can receive or transfer RF signals transiting through connecting waveguides (not shown), as well as act as transformer or impedance match segments. Port interface section 122 and waveguide interface flange 123 can be employed to transition internal port 113 to a standardized waveguide type or size, such as WR-34 or WR-42, or to provide a structural mount for quad polarizer feed 105. Portion 120 can comprise a ¼ wavelength (λ) transformer to a rectangular waveguide (e.g. WR-34 or WR-42). Other waveguide types can couple to waveguide interface flange 123, such as ridged waveguides (e.g. WRD-580).

Figure 2:
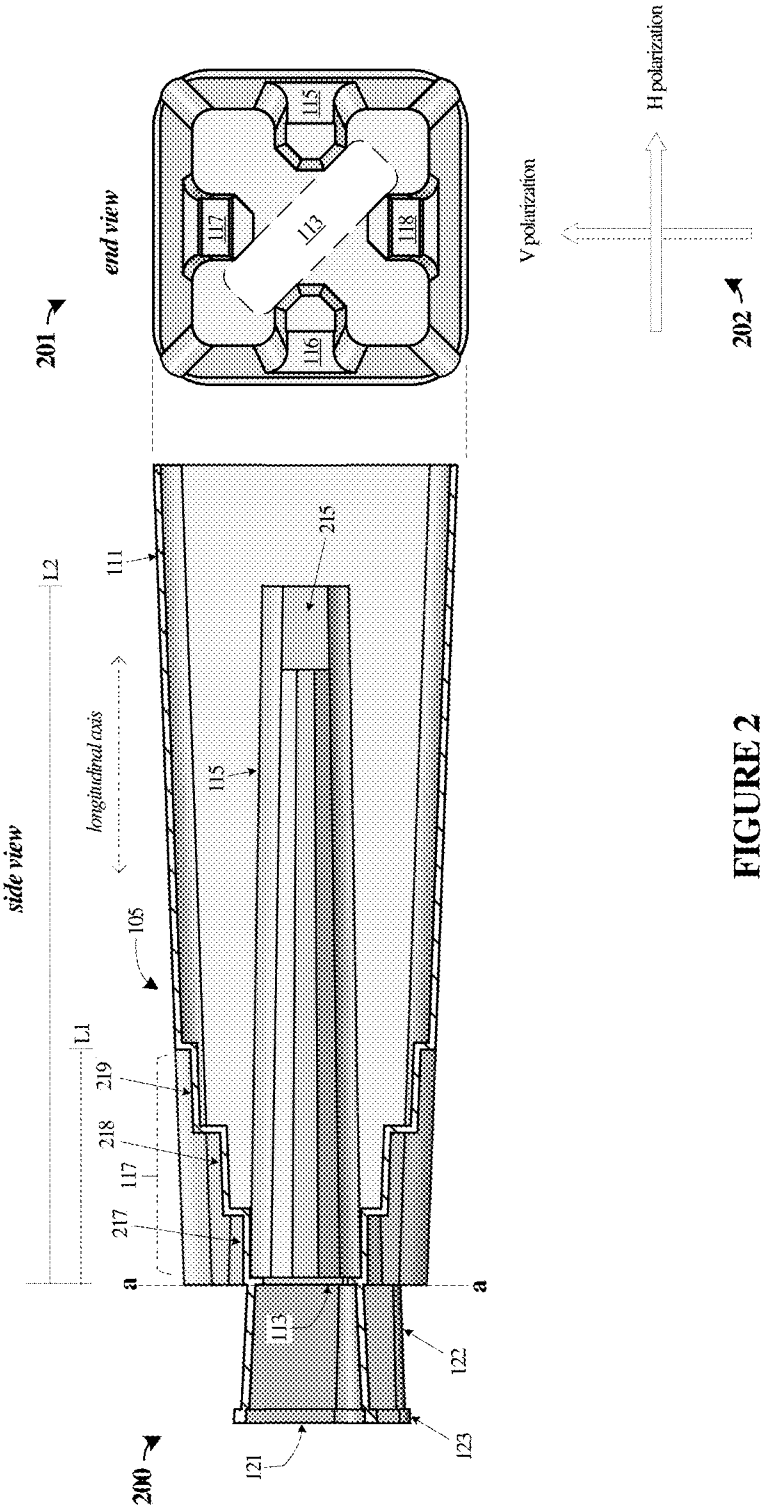
FIG. 2 illustrates cross-sectional views of a quad polarizer feed in an implementation.

FIG. 2 illustrates additional views of quad polarizer feed 105 in an implementation. Specifically, FIG. 2 includes cross-sectional side view 200 (with similar sectioning as view 101 in FIG. 1) and end view 202 looking down the longitudinal axis from external port 112 of quad polarizer feed 105. Example signal propagation polarizations 202 are shown with relation to end view 201. Section a-a is shown as a split plane for manufacturing using an injection molding technique, where the direction of draft angles changes based on a tooling pull direction.

Figure 4:
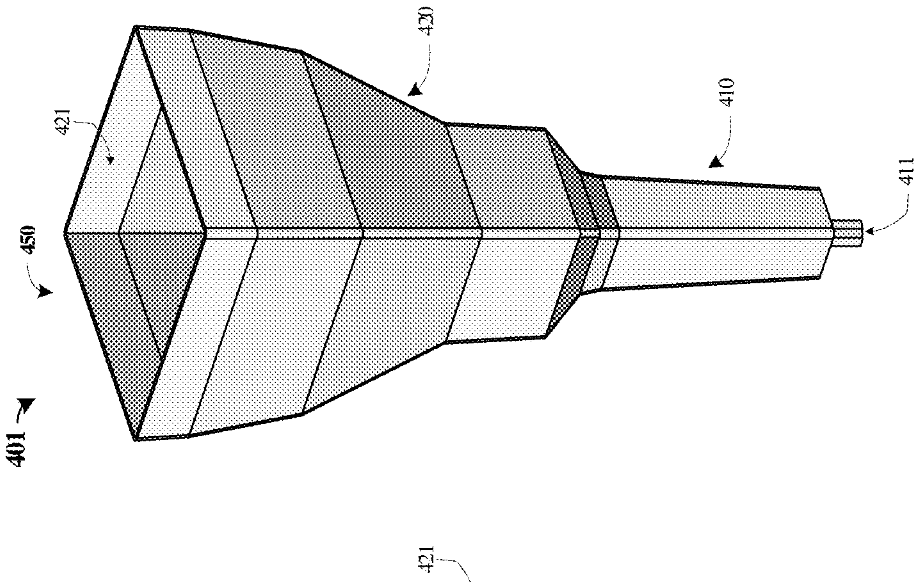
FIG. 4 illustrates a horn antenna assembly in an implementation.
Figure 4:
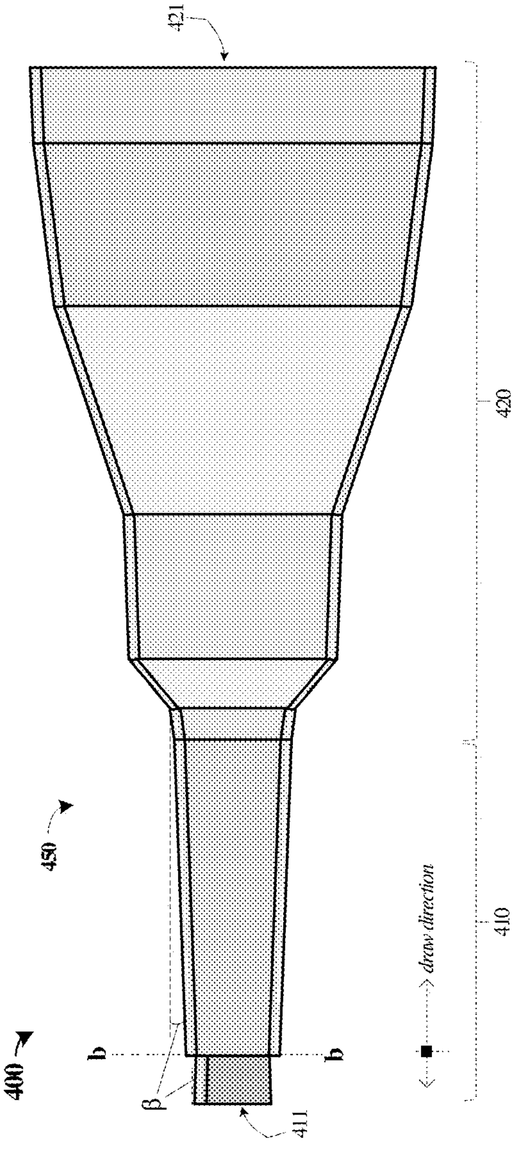

FIG. 2 also shows additional features of the physical structure of waveguide 111. An example length of waveguide 111 is approximately 1.2 inches. Also, filleted corners are established on the generally square waveguide shape and along the longitudinal edges of wall ridges. The wall ridges are formed not from solid material in this example, but instead formed from hollow shapes which are not backfilled with material during an injection molding process. In this manner, the structure of waveguide 111 itself comprises the wall ridges, leading to structural rigidity to waveguide 111 as well as reduced weight when compared to solid or machined versions. As mentioned, waveguide 111 has a generally square cross-sectional shape, which provides for efficient physical packing of many waveguides and associated horn antennas into large arrays. A square horn element has better aperture efficiency than round or circular horn element for the same unit cell size, and a square polarizer/feed (e.g. quad polarizer feed 105) couples to these square horn elements. Advantageously, a square multi-mode horn antenna integrated with quad polarizer feed 105 (such as seen in FIG. 4 below) provides for improved aperture efficiency, reduced length and broad performance bandwidth.

View 200 shows the stepped features of top/bottom waveguide wall ridges 117-118, notably steps 217-219 for ridge 117. This series of the corresponding steps reduce a height of waveguide wall ridges 117-118 from an initial height at internal port 113 to ultimately merge with the associated surfaces (ceiling/floor) of waveguide 111. The features of the steps on all waveguide wall ridges are sloped to accommodate the selected draft angles. The quantity, length, and configuration of the step features on all waveguide wall ridges can be selected based on application and target performance characteristics for quad polarizer feed 105.

L1 comprises a length short enough to maintain a target power split and impedance properties of quad polarizer feed 105. For example, length L1 and the quantity or configuration of steps 217-219 can be selected to transition to the wall of waveguide 111 after a target power split is achieved by the waveguide wall ridges (i.e. equal power split between horizontal/vertical propagation modes). The power split is achieved by at least in part by physical symmetry among the four ridges proximate to internal port 113, and then this symmetry is broken along the longitudinal length of waveguide 111 (e.g. at L1). In this example, an equal power split is achieved by having all four waveguide wall ridges run to and be flush with the backwall of waveguide 111 at internal port 113 and begin at approximately equal depths into the cavity volume of waveguide 111 (referred to as 'height' above). This configuration can be seen in end view 201 where ridges 115-118 each extend to similar depths from the walls towards the centerline of waveguide 111.

Side waveguide wall ridges 115-116 extend longitudinally until length L2 to establish a difference in longitudinal length among ridges, namely between top/bottom waveguide wall ridges at L1 and side waveguide wall ridges 115-116 at L2. Thus, a first set of opposing waveguide wall ridges is established by ridges 115-116 and a second set of opposing waveguide ridges is established by ridges 117-118. The difference in longitudinal length between the two opposing sets of waveguide wall ridges generates a target phase shift between propagation modes (i.e. 90° phase shift between horizontal/vertical propagation modes). A first set of two opposing ridges (117-118) step down after a launch section leaving a second set of opposing ridges (115-116) to generate a phase shift in a signal transiting waveguide 111. In this manner, the 90° phase shift for cross-polarization (CP) is generated. This use of the two sets of opposing waveguide ridges avoids the need for corrugations or dimples along the length of waveguide 111. To further describe the waveguide wall ridges, all four side ridges establish a power split and impedance properties at internal port 113, while one opposing set of wall ridges continues for a longer longitudinal length than the other set of opposing wall ridges before tapering down to the wall. When internal port 113 is driven (via port 121) with a single propagation mode, two modes are resultantly established at external port 112, each mode having a 90° difference in phase. L2 can thus be selected to achieve this target phase shift, at which point side waveguide wall ridges 115-116 terminate by transitioning to the walls of waveguide 111.

Figure 3:
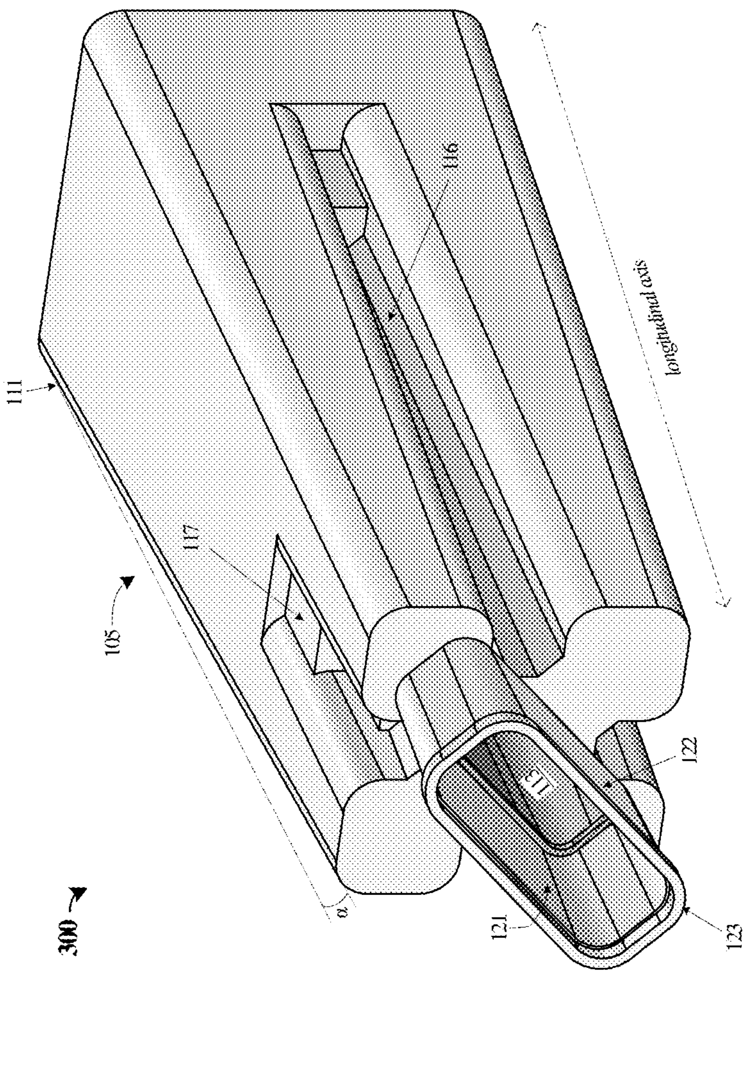
FIG. 3 illustrates an isometric rear end view of a quad polarizer feed in an implementation.

View 201 shows a rear port, comprising internal port 113 and feed port 121, having rectangular cross-sectional configurations oriented on a diagonal or 45° off-axis with respect to the square shape of waveguide 111. When being driven with a signal in a transmit operational mode, internal port 113 thus drives waveguide 111 at 45° off-axis. Internal port 113 and feed port 121 also step up the physical cavity size from a feed waveguide (not shown) to the size of waveguide 111. Clocking the rear port 90° results in a switch from right-hand circular polarization (RHCP) only to left-hand circular polarization (LHCP) only (or vice versa). FIG. 3 illustrates rear view 300 further showing the off-axis rear port, namely feed port 121, along with internal port 113 and views of waveguide wall ridges 116-117 from a rear perspective.

The enhanced structures and features of quad polarizer feed 105 have the flexibility to be manufactured using any desired manufacturing approach, including electrical discharge machining (EDM), direct machining, or injection molding. However, the specific requirements of injection molding tooling, namely use of draft angles, can pose challenges for other waveguides and feeds. When an injection molding or casting process is employed to form quad polarizer feed 105, waveguide 111, external port 112, internal port 113, waveguide wall ridges 115-118, elements 122-123, and associated cavities, each comprise geometry incorporating draft angles corresponding to the selected molding or casting technique, and can be formed from a single workpiece or molded piece of material. In some manufacturing scenarios, section a-a (seen in FIG. 2) also indicates a reflection or change in draft angles corresponding to a different tooling pull or extraction directions to form the single part/piece. For example, tooling used to form portion 110 is pulled (or extracted) to the right, and tooling used to form portion 120 is pulled (or extracted) to the left. The direction of draft angles for interior features (e.g. ridges) are typically mirrored or opposite from draft angles for exterior features (e.g. waveguide walls). This change in draft angle direction accommodates mold elements (e.g. die or mandrel) inserted into cavities during an injection molding process. Thus, external features will generally increase in size/diameter, while internal features will generally decrease in size/diameter over the pull direction.

FIG. 4 illustrates horn antenna assembly 450 in an implementation. View 400 is a side view of horn antenna assembly 450, and view 401 is a top isometric view. Horn antenna assembly 450 is formed from quad polarizer feed 410 and horn antenna element 420. Horn antenna assembly 450 includes rear port 411 and aperture 421. During transmission operations, RF signals can be introduced to rear port 411 for transmission by aperture 421. During receive operations, RF signals can be received at aperture 421 for delivery to rear port 411. Rear port 411 can further couple to waveguides or signal conduits which carry the signals to and from various RF equipment, such as receiver or transmitter equipment (not shown). Sizing provided by rear port 411 can accommodate standardized or custom waveguide sizes, such as those discussed herein.

In FIG. 4, horn antenna element 420 is coupled to quad polarizer feed 410, and can be formed from the same piece of material or injection molded into a single workpiece, although other manufacturing techniques are possible. Various surface platings, coatings, or other surface treatments can be employed to form a conductive layer at least on RF signal contacting portions of horn antenna assembly 450, such as an interior portion of horn antenna element 420 and corresponding interior and mating portions of quad polarizer feed 410. When injection molding techniques are employed, section b-b is shown as a split plane, where the direction of draft angles (β) change based on a tooling pull or draw direction. Several instances of horn antenna assembly 450 can be formed into an array of many rows and columns of horn antenna assembly 450. These arrays can be used for directed energy applications, ESAs, or various other transmit/receive steering techniques using signal phase shifting among rear ports of each horn antenna of the array. Since the square shape of the horn element packs together with other square horn elements without inter-horn gapping or holes, an efficient array of such horn assemblies can be manufactured. In one example, a row of 1 by ‘n’ instances of horn antenna assembly 450 can be formed into a single workpiece using an injection molding technique, and these individual rows can be packed together to form an array of ‘m’ by ‘n’ instances, or larger arrays using several instances of the row assembly. Both direct radiating systems and reflector-fed systems can be formed from such arrays.

Figure 6:
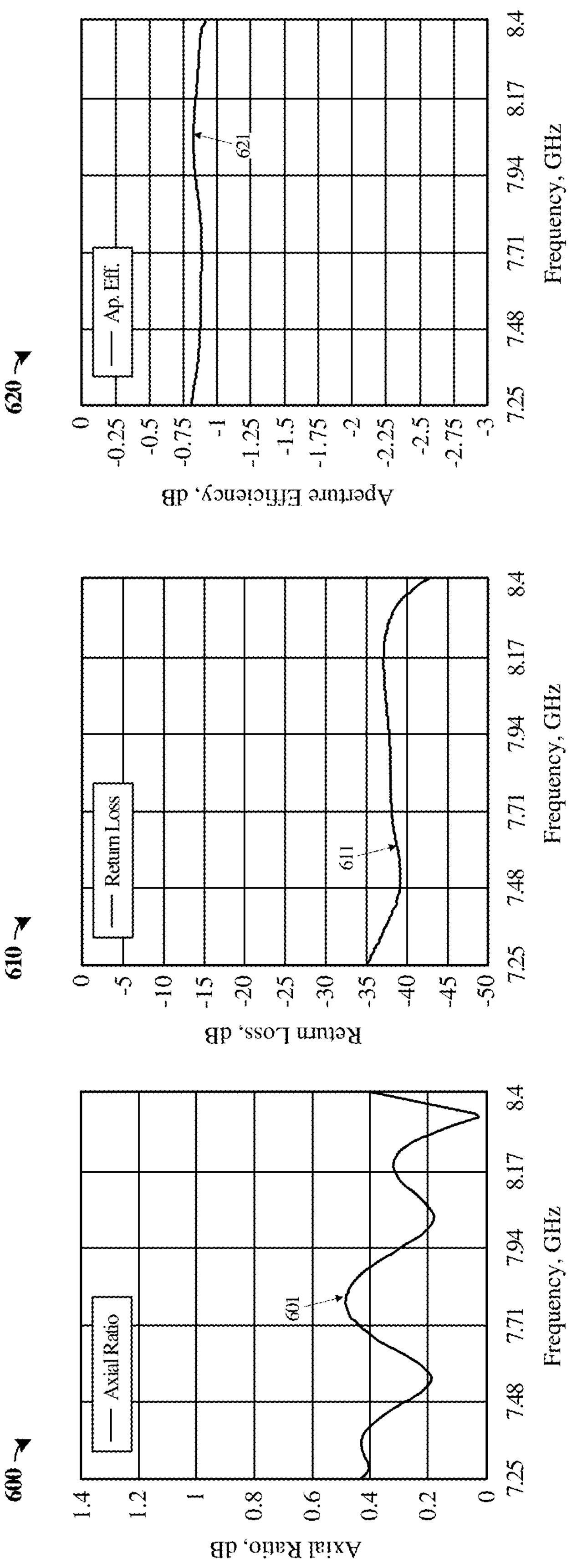
FIG. 6 illustrates performance characteristics of a quad polarizer feed in an implementation.

Horn antenna assembly 450 thus comprises a square multi-mode horn integrated with a polarizer for improved aperture efficiency, reduced length and broad performance bandwidth. Quad polarizer feed 410 can be an example of quad polarizer feed 105 when coupled to a horn element. While the specific frequency range suitable for horn antenna assembly 450 can vary, one example is shown in FIG. 6 for X band of microwave frequencies. Other frequency ranges, such as various K bands, can be deployed using geometry/feature scaling to suit the selected frequency range.

Figure 5:
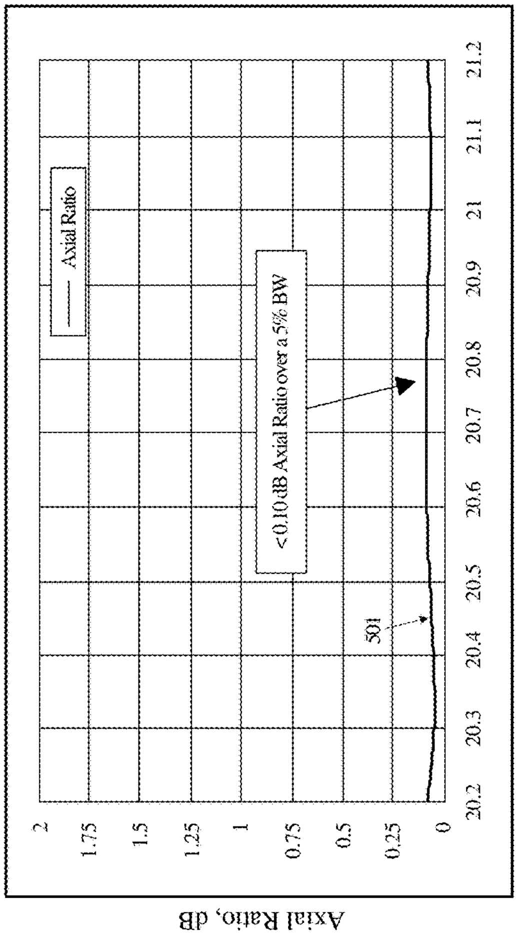
FIG. 5 illustrates performance characteristics of a quad polarizer feed in an implementation.
Figure 5:
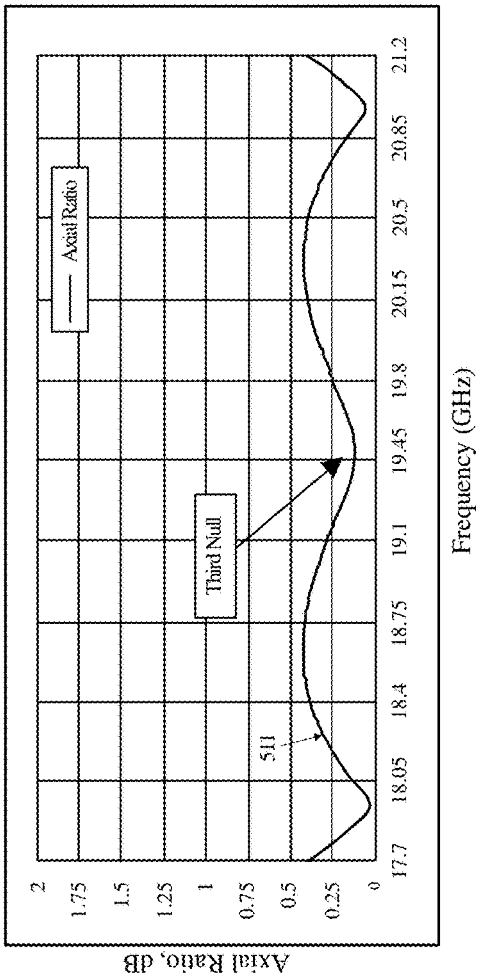

FIG. 5 illustrates performance characteristics of a quad polarizer feed in an implementation. Graphs 500 and 510 are included which indicate performance over a frequency range included in the microwave K band. The quad polarizer feed characterized in FIG. 5 can be that of quad polarizer feed 105 or 410 discussed herein, if sized for the appropriate frequency band. It should be noted that graphs 500 and 510 indicate simulated data for the polarizer section alone without including a horn aperture. A horn aperture will slightly degrade the axial ratio performance offered by the polarizer section alone, which is reflected in graph 600 of FIG. 6.

Graph 500 illustrates performance optimized for 5 percent bandwidth of the microwave K band. Graph 500 includes a vertical axis indicating axial ratio (in dB) and a horizontal axis indicating frequency in GHz. Curve 501 in graph 500 shows a <0.10 dB axial ratio over a 5% bandwidth. This indicates the quad polarizers discussed herein achieve outstanding narrowband performance. Graph 600 illustrates performance optimized for 18 percent bandwidth of the microwave K band. Graph 510 includes a vertical axis indicating axial ratio (in dB) and a horizontal axis indicating frequency in GHz. Curve 511 shows performance of a quad polarizer exhibiting a third null in axial ratio. This third null indicates the quad polarizers discussed herein achieve broadband performance competing with other approaches, such as corrugated polarizer approaches. The quad polarizer topology discussed herein has a phase differential which crosses 90° three times which leads to a highly desirable third null in the axial ratio over frequency. Resulting performance competes favorably with even that of the complex and expensive traditional polarizer approaches. When compared to other low-complexity approaches such as a pinch polarizer, the quad polarizers discussed herein can achieve 3× the bandwidth and 8× better axial ratio along with a greater than 6 dB improvement in return loss. These performance improvements also are achieved in a smaller physical package than most other polarizers. The use of injection molding techniques can reduce the mass by a factor of two as compared to EDM or direct machined parts.

FIG. 6 illustrates additional performance characteristics of a quad polarizer feed in an implementation. The performance characteristics in FIG. 6 relate to performance of a quad polarizer feed with a square horn antenna element, such as seen in FIG. 4. Graphs 600, 610, and 620 are included which indicate performance over a frequency range included in the microwave X band. The quad polarizer feed characterized in FIG. 6 can be that of quad polarizer feed 105 or 410 discussed herein (when fitted to a square horn element), if sized for the appropriate frequency band.

The square horn employed for the performance characteristics in FIG. 6 comprises a 4-flare square horn, having a horn length of 3.52 at 7.25 GHz. The square waveguide output of the quad polarizer lends itself to a square multi-mode horn aperture, as noted herein. When deployed into an array, a square horn has inherently better aperture efficiency for the same unit cell size as compared to other horn types, namely circular.

Graph 600 includes a vertical axis indicating axial ratio (in dB) and a horizontal axis indicating frequency in GHz. Curve 601 in graph 600 shows axial ratio performance over a selected frequency range. Graph 610 includes a vertical axis indicating return loss (in dB) and a horizontal axis indicating frequency in GHz. Curve 611 in graph 610 shows return loss performance over the selected frequency range. Graph 620 includes a vertical axis indicating aperture efficiency (in dB) and a horizontal axis indicating frequency in GHz. Curve 621 in graph 620 shows aperture efficiency performance over the selected frequency range. Thus, the graphs in FIG. 6 show the quad polarizers discussed herein achieve a broadband performance with reduced length as compared to the other styles of horns, while decreasing aperture mass and improving performance.

It should be understood that various communication bands and frequencies can be employed for the equipment discussed herein, with corresponding geometry scaling to suit the frequency ranges. For example, the equipment can support a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a waveguide spanning a longitudinal axis between a feed port and an antenna port, wherein the feed port is arranged having a rectangular cross-sectional shape oriented on a diagonal alignment with respect to walls of the waveguide;

first ridge elements that span longitudinally from the feed port on first opposing walls of the waveguide;

second ridge elements that span longitudinally from the feed port on second opposing walls of the waveguide;

wherein a polarization of a radio frequency signal transiting the waveguide is altered based at least on a difference in longitudinal lengths between the first ridge elements and the second ridge elements.

2. The apparatus of claim 1, wherein the radio frequency signal, when introduced to the waveguide at the feed port and having a linear polarization, is altered to have a circular polarization by at least the difference in longitudinal lengths between the first ridge elements and the second ridge elements.

3. The apparatus of claim 1, wherein a protrusion depth into the waveguide is established for the first ridge elements and the second ridge elements at the feed port to achieve an approximately equal power split for the radio frequency signal.

4. The apparatus of claim 3, wherein the first ridge elements taper down for a first associated protrusion depth to the first opposing walls of the waveguide at a longitudinal length shorter than the second ridge elements taper down for a second associated protrusion depth to the second opposing walls.

5. The apparatus of claim 1, wherein the walls of the waveguide, the first ridge elements, and the second ridge elements each comprise draft angles suitable for preventing undercuts using an injection molding manufacturing technique.

6. The apparatus of claim 5, wherein the injection molding manufacturing technique forms the walls of the waveguide, the first ridge elements, and the second ridge elements into a single piece of material.

7. The apparatus of claim 6, comprising:

conductive plating applied to surfaces of the single piece of the material that contact the radio frequency signal.

8. The apparatus of claim 1, comprising:

a horn element coupled to the antenna port and comprising a horn aperture.

9. The apparatus of claim 8, wherein the horn element, the walls of the waveguide, the first ridge elements, and the second ridge elements each comprise draft angles suitable for preventing undercuts using an injection molding manufacturing technique; and wherein the injection molding manufacturing technique forms the horn element, the walls of the waveguide, the first ridge elements, and the second ridge elements into a single piece of material.

10. The apparatus of claim 1, wherein the waveguide comprises a generally square cross-sectional shape, and wherein the feed port conforms to a standardized waveguide type.

11. A method, comprising:

forming a waveguide having a generally square cross-section spanning a longitudinal axis between a feed port and an antenna port, wherein the feed port is arranged having a rectangular cross-sectional shape oriented on a diagonal alignment with respect to walls of the waveguide;

forming first ridge elements having a first length spanning from the feed port and along the longitudinal axis on first opposing walls of the waveguide;

forming second ridge elements having a second length spanning from the feed port and along the longitudinal axis on second opposing walls of the waveguide; and wherein a polarization of a radio frequency signal transiting the waveguide is altered based at least on a difference in lengths between the first ridge elements and the second ridge elements.

12. The method of claim 11, wherein a protrusion depth into the waveguide is established for the first ridge elements and the second ridge elements at the feed port to achieve an approximately equal power split for the radio frequency signal.

13. The method of claim 12, wherein the first ridge elements taper down for a first associated protrusion depth to the first opposing walls of the waveguide at a longitudinal length shorter than the second ridge elements taper down for a second associated protrusion depth to the second opposing walls.

14. The method of claim 11, wherein the walls of the waveguide, the first ridge elements, and the second ridge elements each comprise draft angles suitable for preventing undercuts using an injection molding manufacturing technique.

15. The method of claim 14, wherein the injection molding manufacturing technique forms the walls of the waveguide, the first ridge elements, and the second ridge elements into a single piece of material.

16. The method of claim 15, comprising:

applying conductive plating to surfaces of the single piece of the material that contact the radio frequency signal.

17. The method of claim 11, further comprising:

forming a horn element coupled to the antenna port and comprising a horn aperture.

18. The method of claim 17, wherein the horn element, the walls of the waveguide, the first ridge elements, and the second ridge elements each comprise draft angles suitable for preventing undercuts using an injection molding manufacturing technique; and wherein the injection molding manufacturing technique forms the horn element, the walls of the waveguide, the first ridge elements, and the second ridge elements into a single piece of material.

19. A horn antenna assembly, comprising:

a polarizer comprising:

a waveguide spanning a longitudinal axis between a feed port and an antenna port, wherein the feed port is arranged having a rectangular cross-sectional shape oriented on a diagonal alignment with respect to walls of the waveguide;

first ridge elements that span a first length along the longitudinal axis from the feed port on first opposing walls of the waveguide;

second ridge elements that span a second length along the longitudinal axis from the feed port on second opposing walls of the waveguide, wherein the first length is different than the second length;

wherein a polarization of a radio frequency signal transiting the waveguide is altered based at least on a difference in lengths between the first ridge elements and the second ridge elements; and a horn antenna element comprising:

a horn structure having a radio frequency aperture and a port, wherein the port is coupled to the antenna port of the polarizer.

* * * * *